KUHNS & HAINES.
Grain-Drill.

No. 15,810. Patented Sept. 30. 1856.

UNITED STATES PATENT OFFICE.

B. KUHNS, OF DAYTON, OHIO, AND M. J. HAINES, OF DELAWARE CITY, DEL.

IMPROVEMENT IN SEED-PLANTERS.

Specification forming part of Letters Patent No. 15,810, dated September 30, 1856.

*To all whom it may concern:*

Be it known that we, B. KUHNS, of Dayton, in the county of Montgomery and State of Ohio, and M. J. HAINES, of Delaware City, in the county of Newcastle and State of Delaware, have invented a new and useful Improvement in Seed-Planters; and we do hereby declare that the following is a full, clear, and exact description of the construction and operation of the same, reference being had to the annexed drawings, forming part of this specification, in which—

Figure 1:
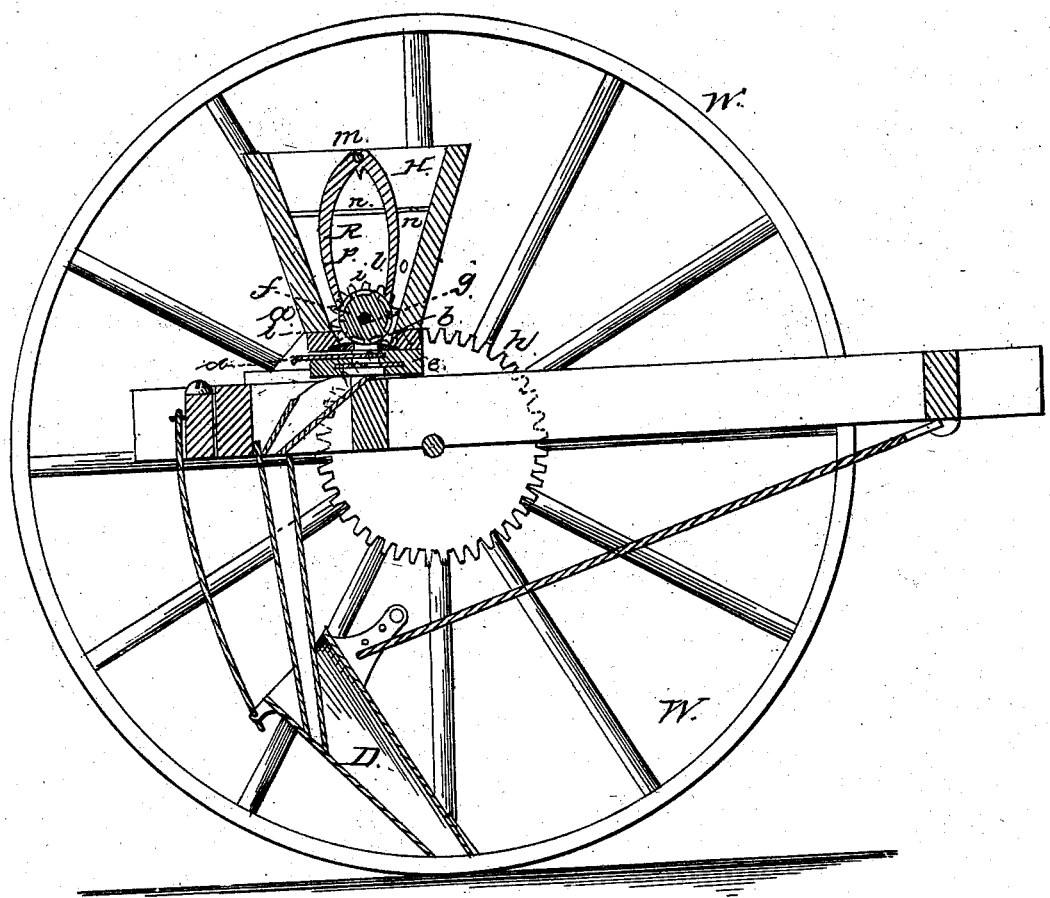
Figure 2:
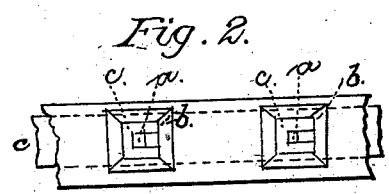
Figure 3:
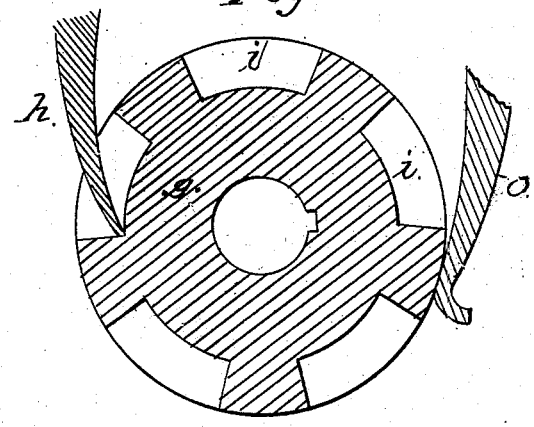

Figure 1 is a vertical section of the machine, taken perpendicular to the axis of the discharging-rollers through one of the drill-tubes. Fig. 2 is a plan of cell in bottom of hopper, showing adjustable opening.

Similar characters of reference in the several figures denote the same part.

The invention here considered refers to the seed-discharge of the planters known as "seed-drills," and is designed to render said discharge regular. To do this it is requisite that a uniform supply of seed shall be delivered to the discharging-apertures as the machine moves forward. This we effect by constructing the adjustable discharge-apertures in the bottom of cells having inclined sides, and in placing over each opening and close to the bottom of the cell a roller having pockets in its periphery at regular intervals, which are designed by rotation to convey a given quantity of seed at regular intervals to the opening in the bottom of the cell; but, as the quantity of seed carried to the opening may become irregular by the choking of some of the pockets, we have combined with the roller and cell a pocket-clearer actuated by the rotation of the roller, which insures that no packing of seed shall take place in the pockets, thus avoiding irregularity of discharge on that account. This combination of cell, roller, and pocket-cleaner, arranged and operating as will be described, constitutes our invention.

In the drawings, H is the hopper, D the drill-tube, and W one of the wheels of the seed-drill. The discharge-opening $a$ is in the bottom of a cell, $b$, which constitutes one of a series throughout the length of the hopper. This opening is adjustable by the slide $c$, or in any of the well-known methods. There are separate cut-off slides $d$ under the openings, and also a cut-off, $e$, for stopping the entire discharge. These features are, however, altogether independent of our invention. A shaft, $f$, extends through the hopper, upon which are secured (over each discharge-opening) a series of rollers, $g$, each having pockets $i$ in its periphery. These rollers are close to the bottom of the cells, and are rotated in direction of arrow by the forward motion of the machine through the gearing-connection $h$ $l$.

Longitudinally along the upper portion of the hopper runs a shaft, $m$, upon which are hung a series of clearers, R, one over each roller $g$. These clearers are free to turn on the shaft $m$, and are kept from lateral movement by guides $n$, or in any suitable manner. They consist of two legs, $o$ and $p$, embracing the roller, one, $o$, turned up at the extremity and the other terminating in a scraping-edge. The distance between these legs is such that when the turned up extremity of leg $o$ is on the ridge between two pockets the leg $p$ will be forced down into the pocket on the opposite side of the roller, and, scraping over the bottom thereof, will remove any packed grain that may be therein. As the leg $p$ leaves a pocket the leg $o$ falls into a pocket on the opposite side, and as leg $o$ rises on the next ridge the scraper $p$ will be forced into the next pocket. Thus every pocket will be acted on by the scraper $p$ at each rotation of the roller by reason of the action of the alternate ridges of the roller upon the leg $o$, as above set forth, so that the clearing of the pockets for insuring a uniform discharge of seed is effected by the rotation of the roller itself.

The operation of our improvement may be thus stated: The cell submits the seed to the action of the roller, the pockets of which convey a uniform supply to the discharge-openings, since pockets of the same capacity discharge to the opening at regular intervals, this uniformity of capacity being insured by the clearer, actuated by the rotation of the roller itself.

We disclaim of itself the pocketed roller, and also the cells surrounding the discharge-opening; but

We claim as new and of our invention—

The combination of the cell and pocketed roller with the pocket-clearer actuated by the rotation of the roller, operating as and for the purposes set forth.

In testimony whereof we have hereunto signed our names before two subscribing witnesses.

B. KUHNS.
M. J. HAINES.

Witnesses to Kuhns's signature:
   GEO. PATTEN,
   JAS. D. CLARY.
Witnesses to Haines's signature:
   JOHN W. DAVIDSON,
   GEO. W. CRAIG.